March 20, 1934.  C. T. HARDING  1,951,792
PROCESS FOR HYDROGENATING HYDROCARBON OILS
Filed Oct. 30, 1930
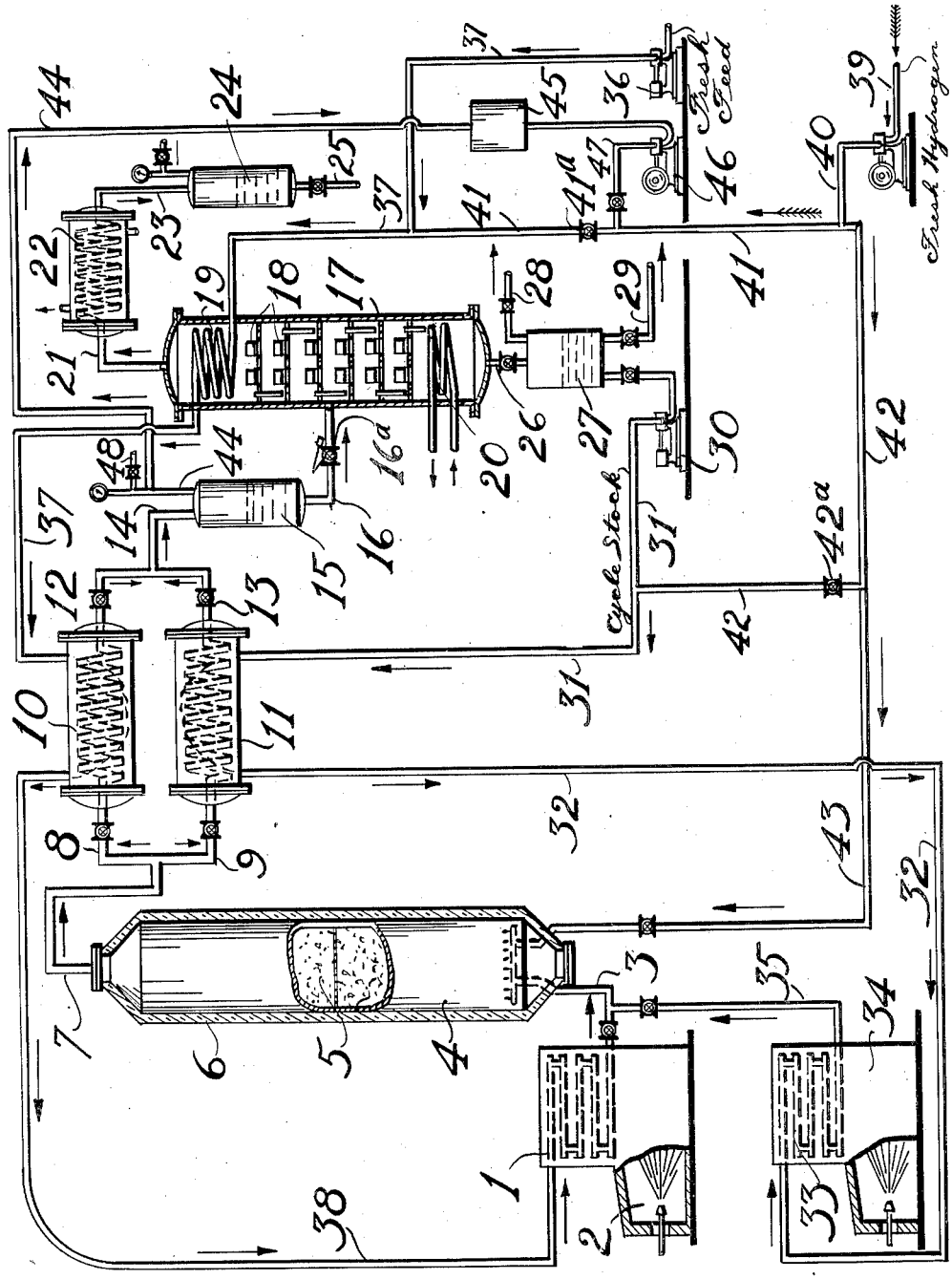
INVENTOR.
Clarke T. Harding
BY
_____ ATTORNEY.

Patented Mar. 20, 1934

1,951,792

UNITED STATES PATENT OFFICE 1,951,792

PROCESS FOR HYDROGENATING HYDRO-
CARBON OILS

Clarke T. Harding, Baton Rouge, La., assignor to
Standard-I. G. Company

Application October 30, 1930, Serial No. 492,106

5 Claims. (Cl. 196—53)

This invention relates to a continuous recycling process for the hydrogenation of hydrocarbon oils, and more specifically comprises an improved method of heating the oils prior to discharging them into the high temperature hydrogenation reactor. My process will be fully understood from the following description and the accompanying drawing.

The drawing is a semi-diagrammatic view in sectional elevation of a suitable apparatus for accomplishing my improved process, and indicates the flow of materials.

In the drawing, reference character 1 designates a heating coil mounted in a suitable furnace setting 2 preferably fired by gas although other heating means may be used, through which fresh feed oil preferably in admixture with hydrogen is forced, and in which the mixture is raised to a temperature in excess of 750° F. The heated mixture flows through line 3 and is discharged through suitable openings into reactor 4 which is adapted to withstand pressures in excess of 200 atmospheres or more and temperatures in excess of 1000° F., and is also resistant to attack by hydrogen and the reactants. Reactor 4 preferably contains catalytic material 5 the nature of which will be disclosed below. It may also be covered with a layer of suitable insulating material 6.

Reactor 4 is maintained under pressure in excess of 20 atmospheres, and preferably 100 or 200 atmospheres or more, and at temperatures in excess of 800° F., the exact temperature being determined by the nature of the oil being treated, for example between 800 and 900° F., for a heavy oil such as a reduced crude or heavy residue and between 900 and 1100° F., for a lighter oil such as a gas oil.

Hot reactants flow out of reactor 4 through line 7 and pass through lines 8 and/or 9 into preliminary coolers 10 and 11, wherein they are cooled by interchange of heat with fresh oil and recycle oil respectively and flow thence through lines 12 and/or 13 and line 14 into separator 15 wherein the vapor and liquid are separated.

Liquid products flow out of separator 15 through line 16 past pressure reduction valve 16a and flash into a fractionating tower 17 which may be equipped with bubble cap plates 18, cooling coil 19 and heating coil 20. The lighter fractions of the liquid product pass out of tower 17 as vapor through line 21 and are condensed in cooler 22 from which condensate flows through line 23 into drum 24. This light product may be withdrawn from drum 24 through line 25 and sent to storage or to equipment for further treatment.

The heavier fractions of the liquid product from separator 15 collect at the bottom of tower 17 and may be withdrawn therefrom through line 26 which discharges into a temporary storage drum 27 fitted with gas release line 28 and draw-off pipe 29. If it is desired to recycle the heavy condensate, it is withdrawn from drum 27 by pump 30, forced through line 31 into cooler 11, referred to above, wherein it is partially preheated, and from which it flows through line 32 into heating coil 33 mounted in furnace setting 34, wherein it is further heated to a temperature above 750° F., and flows thence through line 35 which meets line 3 that discharges into reactor 4. The exact temperature to which the recycle oil is raised will depend upon the nature of the oil being treated and upon other factors which will be more fully discussed below.

Fresh feed oil is drawn from suitable storage (not shown) by high pressure pump 36 and is forced at high pressure, preferably 1500 or 3000 lbs. per sq. in., through the cooling coil 19 in tower 17 wherein it is partially heated, thence through line 37 into cooler 10 wherein it is further preheated by interchange of heat with hot reactants from reactor 4 and flows thence through line 38 into heating coil 1.

Hydrogen or gas rich in free hydrogen is drawn from a suitable gas holder through line 39, raised to a pressure in excess of 20 atmospheres, preferably 100 or 200 atmospheres or higher, and forced through line 40 which is connected by line 41 to fresh feed line 37 and by line 42 to cycle oil line 31. Lines 41 and 42 are fitted with valves 41a and 42a respectively so that fresh hydrogen may or may not be mixed with fresh feed and cycle oil before entering the reactor. If it is desired to introduce hydrogen directly into the reactor it may be admitted through line 43.

The gases in separator 15 contain a substantial amount of free hydrogen which may be advantageously recirculated to the reactor. These gases pass out of the separator through line 44 and flow into purifier 45 wherein hydrogen sulfide, ammonia or other impurities as well as uncondensed hydrocarbon gases are scrubbed out. The purified gas is recompressed to reactor pressure by booster compressor 46 which discharges through line 47 into fresh hydrogen line 41. Should it be necessary to release gas from separator 15 without recirculation this may be done through line 48.

Catalysts that may be used for hydrocyliformation or hydroformation comprise the oxides or sulfides of metals of the II, IV and VI groups of the periodic system. Chromium, molybdenum and tungsten oxides preferably in admixture with magnesium or zinc oxides are especially suitable and are characterized by immunity to sulfur poisoning.

The term "hydroforming" is defined on page 578 of Ellis' book on "Hydrogenation of Organic Substances" third edition, as the type of reaction "where great disturbance of carbon structure results". The term "hydrocycliformation" is a specific type of hydroformation in which hydrocarbons of a cyclic or aromatic nature are produced by the reaction.

In the operation of my process the fresh feed oil may be a gas oil fraction, a reduced crude or heavy residue, or similar fractions. When treating gas oils, low boiling hydrocarbons of superior anti-detonation quality especially suitable for motor fuel are produced by hydrocycliformation carried out at temperatures between about 900 and 1100°F. The heavier fraction of the vapor leaving the hydrocycliformation zone is continuously separated from the lighter fraction and is returned to the hydrocycliformation through a heating zone. Fresh feed is continuously discharged into the hydrocycliformation zone after passage through a different heating zone than that used for the cycle oil, the two streams uniting before entering the reactor. In this way the fresh feed, which has a greater tendency to coke in the heating coil may be heated to a temperature below that at which coke formation is rapid, which is in general below the temperature required for hydrocycliformation, and the cycle oil, which after its passage through the hydrocycliformation zone is more saturated and hence has less tendency to coke when heated, may be heated to a temperature somewhat higher than that necessary for hydrocycliformation, so that when the two streams are united the temperature of the resulting mixture is approximately that required for hydrocycliformation. For example, if the temperature of hydrocycliformation is 980° F., the fresh feed may be heated to only about 950° F., and the cycle stock to about 1000° F. so that when the two are mixed the resulting temperature will be about 980° F. It will be understood that the temperature to which it is necessary to heat the fresh feed will be largely determined by the temperature at which it tends to coke, and that the temperature to which the cycle stock must be heated will then depend upon the temperature to which the fresh feed has been heated, the ratio of fresh feed to cycle stock in the mixture and the temperature to which it is desired to heat before discharging into the reaction zone.

Inasmuch as the fresh feed and the cycle oil are heated in separate zones they must also be preheated in separate zones as indicated in the drawing in which fresh feed and cycle oil are preheated in cools 10 and 11 respectively. It will, of course, be understood that either one of the preheaters may be cut out of the system, for example by valves located in lines 8 and 9 so that one of the two oils will get all the preheat.

In certain cases, the cycle oil may have a greater tendency to coke when heated than the fresh oil, for example, in the case of a high boiling, highly aromatic stock and in these cases it will be understood that the method may be reversed, that is the fresh feed may be heated to a higher temperature than the cycle oil before mixing the two and discharging into the reactor.

In any case a simple experiment in the laboratory will indicate to the operator whether the fresh oil or cycle oil has the greater tendency to coke, and he may determine from this which coil to operate at the higher temperature.

Similarly when operating with reduced crudes it has been found that in general the cycle oil has less tendency to coke on heating than the fresh oil, and it is equally advantageous when subjecting these oils to a process of destructive hydrogenation or hydroformation to handle and heat the two oils separately before discharging them into the hydrogenation zone. The temperature required for hydroforming these feed stocks is somewhat lower than that required for hydrocycliformation, being preferably between about 800 and 900° F.

It should be understood that even when heating the mixed oil in a single coil, coke formation is never so rapid that operation cannot be continued for a limited time. The advantage of the heating in separate coils is not so much that it prevents coke formation as that it greatly retards the rate at which it is formed, and operation, can, therefore, be continued for appreciably longer periods before it is necessary to remove the coke.

The two heating coils may be mounted in the same furnace, instead of in separate furnaces, the one in the hotter portion and the other in the colder portion, or any other suitable arrangement may be made to effect the separate heating of the fresh oil and cycle oil.

It is not necessary that the fresh oil and cycle oil be kept strictly separate during the heating; but one stream should contain a majority of fresh oil and the other stream a majority of cycle oil. In some cases it may be particularly advantageous to mix a small portion of the cycle oil with the fresh oil. For example, when treating a reduced crude or heavy residue, the cycle oil will contain a heavy tar fraction which has a marked tendency to coke on heating. This heavy tar fraction is best removed from the cycle oil and mixed with fresh oil before heating, because the fresh oil is not heated to as high a temperature in the heating zone as the cycle oil, and the danger of the tar fraction coking is therefore minimized.

As an example of the application of my improved method, a Mid-Continent gas oil of the following characteristics:

| | |
|---|---|
| Gravity A. P. I. | 38.3 |
| Int. boiling pt. | 474° F. |
| Final boiling pt. | 584° F. |
| Aniline point | 163° F. | is passed with hydrogen under 3000 lbs. per sq. in. pressure through a heating coil, wherein it is heated to a temperature of 934° F. The space velocity is 2.0 volumes of oil per volume of reaction space per hour and approximately 1600 cu. ft. of hydrogen are used per barrel of oil. The heated oil discharges into a reactor maintained at 956° F. Vapors are withdrawn and fractionated and a distillate and cycle oil of the following characteristics obtained:

*Distillate*

| | |
|---|---|
| Gravity A. P. I. | 55.9° |
| Int. boiling pt. | 89° F. |
| Final boiling pt. | 429° F. |
| Octane number | 72.0 |

Cycle oil

| | |
|---|---:|
| Gravity A. P. I. | 17.5° |
| Int. boiling pt. | 472° F. |
| Final boiling pt. | 698° F. |
| Aniline point | 45° F. |

Octane number is defined as the per cent of iso-octane that must be added to normal heptane to produce a fuel of the same anti-detonation value as the oil in question. Aniline point is defined as the temperature at which equal volumes of the hydrocarbon oil and aniline are just miscible with each other.

The cycle oil is heated in a separate coil with hydrogen to a temperature of 960° F., fresh oil is heated with hydrogen in a separate coil to only 900° F., and the two oils are mixed in the ratio 55 volumes cycle oil to 45 volumes fresh oil. The temperature of the resulting mixture is then about 934° F. and it is discharged into the reactor as before.

Heating the fresh feed to 900° F. instead of 934° F. greatly reduces the rate of coke formation in the coil and prolongs the period of operation before a shut-down is necessary. The cycle oil can be heated to 960° F. without substantial danger of coking.

This invention is not limited by any theory of the mechanism of the reactions nor by any example given for purposes of illustration, but only by the following claims in which I wish to claim all novelty inherent in the invention.

I claim:

1. In a process for subjecting petroleum fractions to the action of a gas rich in free hydrogen in a reaction zone at a temperature in the upper range commonly used for destructive hydrogenation and suitable for production of light oil of marked anti-detonation value and under hydrogen pressures in excess of 20 atmospheres sufficient to prevent coke formation but insufficient for complete saturation and in which the heavier fractions of the product are continuously condensed and recycled to the hydrogen treatment, the improvement which comprises rapidly preheating the fresh oil and recycled oil of greater thermal stability in separate zones, the former to a temperature adapted to its lesser degree of heat stability and the latter to a higher temperature sufficient to raise the total feed to reaction temperature on mixing, and mixing the separately preheated oils in the reaction zone.

2. In a process of subjecting petroleum fractions to the action of a gas rich in free hydrogen in a catalytic reaction zone at a temperature between 900 and 1100° F. and under hydrogen pressures in excess of 20 atmospheres sufficient to prevent coke formation but insufficient to completely saturate the products and in which the heavier fractions of the product are continuously recycled to the hydrogen treatment, the steps of separately preheating the fresh oil and recycled oil of greater thermal stability in the absence of catalyst to temperatures respectively below and above the temperature maintained in the hydrogenating zone and mixing the preheated oils in the reaction zone whereby the fresh oil is quickly raised to reaction temperature.

3. Process according to claim 2 in which the hydrogen treatment is carried out under pressures in excess of 200 atmospheres.

4. In a process for preparing low boiling hydrocarbons of high anti-detonation value from higher boiling petroleum hydrocarbons by subjecting said hydrocarbons to the action of a gas rich in free hydrogen in a reaction zone containing a stationary catalyst maintained at a temperature between 900 and 1100° F. and under a hydrogen pressure above 100 atmospheres and sufficiently high to prevent coke formation but insufficient to produce saturated products, the steps of pre-heating the recycled heavier fractions of the product in a heating zone, separately heating the fresh oil and mixing the fresh and re-cycled oils in the reaction zone, the temperature to which the fresh oil is pre-heated being below 900° F., and that to which the re-cycled oil is heated being higher than 900°, and sufficient to raise the total oil to a temperature above 900° F.

5. Process according to claim 4 in which the treatment with hydrogen is carried out in the presence of a hydrogenating catalyst characterized by immunity to sulfur poisoning.

CLARKE T. HARDING.